(12) United States Patent
Ilan et al.

(10) Patent No.: US 12,210,537 B2
(45) Date of Patent: Jan. 28, 2025

(54) REFERENCE DISTANCE SIMILARITY SEARCH

(71) Applicant: GSI Technology Inc., Sunnyvale, CA (US)

(72) Inventors: Dan Ilan, Herzliya (IL); Amir Gottlieb, Modi'in (IL)

(73) Assignee: GSI Technology Inc., Sunnyvale, CA (US)

( * ) Notice: Subject to any disclaimer, the term of this patent is extended or adjusted under 35 U.S.C. 154(b) by 106 days.

(21) Appl. No.: 16/858,643

(22) Filed: Apr. 26, 2020

(65) Prior Publication Data

US 2021/0011910 A1    Jan. 14, 2021

Related U.S. Application Data

(60) Provisional application No. 63/003,314, filed on Apr. 1, 2020, provisional application No. 62/871,212, filed on Jul. 8, 2019.

(51) Int. Cl.
*G06F 16/2458* (2019.01)
*G06F 16/22* (2019.01)
*G06F 16/28* (2019.01)

(52) U.S. Cl.
CPC ...... *G06F 16/2465* (2019.01); *G06F 16/2237* (2019.01); *G06F 16/282* (2019.01); *G06F 2216/03* (2013.01)

(58) Field of Classification Search
CPC .. G06F 16/2465; G06F 16/221; G06F 16/282; G06F 16/2237; G06F 2216/03
See application file for complete search history.

(56) References Cited

U.S. PATENT DOCUMENTS

| 9,177,227 | B2 * | 11/2015 | Chehaiber | G06F 16/583 |
| 9,558,812 | B2 | 1/2017 | Akerib | |
| 10,977,250 | B1 * | 4/2021 | Lesner | G06F 16/2237 |
| 2011/0246465 | A1 * | 10/2011 | Koister | G06F 16/3325 |
| | | | | 707/737 |

(Continued)

FOREIGN PATENT DOCUMENTS

CN    109426482 A    3/2019

OTHER PUBLICATIONS

Various, Memory Array: an overview, ohttps://www.sciencedirect.com/topics/computer-science/memory-array, various years, Science Direct (Year: 2016).*

(Continued)

*Primary Examiner* — Brittany N Allen
*Assistant Examiner* — William P Bartlett
(74) *Attorney, Agent, or Firm* — Heidi Brun Associates, Ltd.

(57) ABSTRACT

A similarity search system includes a database of original vectors, a hierarchical database of bins and a similarity searcher. The hierarchical database of bins is stored in an associative memory array, each bin identified by an order vector representing at least one original vector and the dimension of the order vector is smaller than the dimension of the original vector. The similarity searcher searches in the database for at least one similar bin whose order vector resembles an order vector representing a query vector and provides at least one original vector represented by the bin resembling the query vector.

4 Claims, 10 Drawing Sheets

(56) References Cited

U.S. PATENT DOCUMENTS

| | | | |
|---|---|---|---|
| 2012/0278362 A1* | 11/2012 | Mande | G16B 10/00 |
| | | | 707/777 |
| 2013/0238346 A1* | 9/2013 | Vasilache | G10L 19/038 |
| | | | 704/500 |
| 2015/0120750 A1* | 4/2015 | Hefeeda | G06F 16/9027 |
| | | | 707/741 |
| 2018/0107843 A1* | 4/2018 | Setty | H04L 63/0428 |
| 2018/0173726 A1* | 6/2018 | Iwasaki | G06F 16/56 |
| 2019/0065186 A1 | 2/2019 | Lazer | |
| 2020/0380384 A1* | 12/2020 | Karunaratne | G06N 20/10 |

OTHER PUBLICATIONS

Barth, Memory Array Architectures, Barth Development, 2017 (Year: 2017).*

* cited by examiner

REFERENCE DISTANCE SIMILARITY SEARCH

CROSS REFERENCE TO RELATED APPLICATIONS

This application claims priority from U.S. provisional patent application 62/871,212, filed Jul. 8, 2019, and 63/003,314, filed Apr. 1, 2020, both of which are incorporated herein by reference.

FIELD OF THE INVENTION

The present invention relates to associative computation generally and to data mining algorithms using associative computation in particular.

BACKGROUND OF THE INVENTION

Data mining is a computational process of discovering patterns in large datasets. It uses different techniques to analyze the datasets. A computation that is often needed in datamining is a fast and accurate similarity search in n-dimensional space where each item in the space, stored in a large dataset, is represented by a vector of n floating point numbers. The goal of the similarity search is to quickly identify items in the dataset resembling a specific query item, represented also by a vector of n floating point numbers.

Throughout this document, a space comprising L vectors in dimension S is represented as $E=\{E1, E2 \ldots El\}$ $|E|=L$, the query vector is represented as Q (also in dimension S), and a general vector in space E is represented as Ei ($0<i<L$). The goal of the search is to find a subset of K vectors $Ei \in E$, ($K<<L$), most similar to Q, i.e. having the minimal distance to Q.

One of the state-of-the-art solutions for finding the set of K items Ei most similar to a query Q is the K-Nearest-Neighbor search algorithm with a distance function such as L2 distance, cosine distance, Hamming distance and the like.

SUMMARY OF THE PRESENT INVENTION

There is provided in accordance with an embodiment of the present invention a similarity search system. The system includes a database of original vectors, a hierarchical database of bins and a similarity searcher. The hierarchical database of bins is stored in an associative memory array, each bin identified by an order vector representing at least one original vector and the dimension of the order vector is smaller than the dimension of the original vector. The similarity searcher searches in the database for at least one similar bin whose order vector resembles an order vector representing a query vector and provides at least one original vector represented by the bin resembling the query vector.

Additionally, in accordance with an embodiment of the present invention, the bins of the hierarchical database are stored in columns of the associative memory array and the similarity searcher operates simultaneously on a plurality of columns.

Further, in accordance with a preferred embodiment of the present invention, the hierarchical database is arranged in levels, each level stored in a different section of the associative memory array.

Moreover, in accordance with a preferred embodiment of the present invention, the system includes a hierarchical database builder to build the hierarchical database of bins from the database of original vectors.

Still further, in accordance with a preferred embodiment of the present invention, the hierarchical database builder includes a reference vector definer, an order vector creator and a bin creator. The reference vector definer defines a set of reference vectors in a dimension of the original vectors. The order vector creator computes for each original vector a distance to each reference vector and creates an order vector that includes the IDs of the reference vectors ordered by their distance from the original vector and the bin creator creates a bin identified by an order vector representing at least one original vector.

Additionally, in accordance with a preferred embodiment of the present invention, the hierarchical database builder clusters order vectors representing different original vectors sharing an order vector to a single bin.

Moreover, in accordance with a preferred embodiment of the present invention, the hierarchical database includes at least two levels, and a bin in a level is associated with bins in a lower level.

Furthermore, in accordance with a preferred embodiment of the present invention, the similarity searcher starts the search in a first level of the hierarchical database and continues with bins in a lower level associated with bins found in the first level.

There is provided in accordance with an embodiment of the present invention a method for finding a set of vectors in a database of original vectors similar to a query vector. The method includes having access to a set of reference vectors, creating a query order vector associated with the query vector using the reference vectors, the dimension of the query order vector is smaller than the dimension of the query vector. The method also includes searching in a hierarchical database of bins stored in an associative memory array, where each bin, created using the set of reference vectors, represents at least one original vector and identified by an order vector, at least one similar bin whose order vector resembles the query order vector. The method also includes providing at least one original vector represented by the similar bin resembling the query vector.

Furthermore, in accordance with a preferred embodiment of the present invention, the hierarchical database storing bins in columns of the associative memory array and said step of searching operates simultaneously on a plurality of columns.

Still further, in accordance with a preferred embodiment of the present invention, the method includes arranging the hierarchical database in levels, each level in a different section of the associative memory array.

Additionally, in accordance with a preferred embodiment of the present invention, the method includes building the hierarchical database of bins from the database of original vectors.

Moreover, in accordance with a preferred embodiment of the present invention, the step of building the hierarchical database includes defining the set of reference vectors in a dimension of the original vectors, computing for each original vector a distance to each reference vector and creating an order vector that includes IDs of the reference vectors ordered by their distance from the original vector. The method also includes a bin creator to create a bin identified by an order vector representing at least one original vector.

Furthermore, in accordance with a preferred embodiment of the present invention, the method also includes clustering order vectors representing different original vectors sharing an order vector to a single bin.

Still further, in accordance with a preferred embodiment of the present invention, the hierarchical database includes at least two levels, and a bin in a level is associated with bins in a lower level.

16. Additionally, in accordance with a preferred embodiment of the present invention, the step of searching includes starting in a first level of the hierarchical database and continuing with bins in a lower level associated with bins found in the first level.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that associative memory devices like the ones described in U.S. Pat. No. 9,558,812, assigned to the common applicant of the present invention, may be efficiently utilized to provide an accurate similarity search that provides a set of K records most similar to a query record Q with latency of sub 100 micro-seconds. In devices like the ones described in U.S. Pat. No. 9,558,812, a search may be concurrently performed on numerous columns thus providing a search complexity of O(1).

Applicant has further realized that a similarity search performed on a dataset of a lower dimension space, may improve the storage utilization while keeping a high accuracy level and the same latency. In addition, the similarity search may provide adequate results when using a distance similarity search instead of a standard similarity search which may further increase its performance.

Distance similarity search is based on the heuristics that if the distance between a vector E and a vector Q is small (i.e. vectors resemble to each other), then the distance between vector E and a reference vector P is also similar to the distance between vector Q and vector P. In other words, when vector E resembles a reference vector P and a vector Q resembles the same reference vector P, vector E is similar to vector Q.

It may be appreciated that using an alternative dataset of vectors of natural numbers OV in a lower dimension instead of using the original dataset of vectors of floating-point numbers in a higher dimension may improve the storage requirement and the computation performance. In the alternative database, each vector OVi may store the ID of the reference vectors, sorted by their distance from the vector Ei implying its location in the original space. The number of reference vectors may determine the dimension of the new space and may be set to be smaller than the number of the original features of vectors Ei.

The distance similarity concept is illustrated in FIGS. 1A-1E to which reference is now made. The distance between each vector Ei to a set of predetermined reference vectors Pj may be computed in advance, and a new vector OVi with the indices of the reference vectors Pj, ordered by their distance from Ei, may be created. For each new vector Q, a vector OVq may be created (the indices of the reference vectors P, ordered by their distance from Q) and compared to the OVi vectors in the dataset to find the most similar ones from which the most similar Ei may be immediately determined.

Figure 1A:
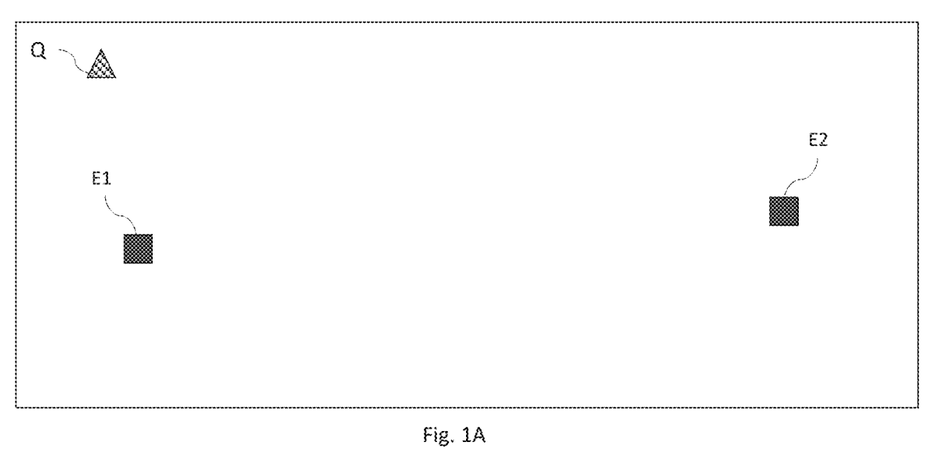
FIGS. 1A-1E are schematic illustrations explaining the distance similarity concept used by systems constructed and operative in accordance with an embodiment of the present invention.
Figure 1B:
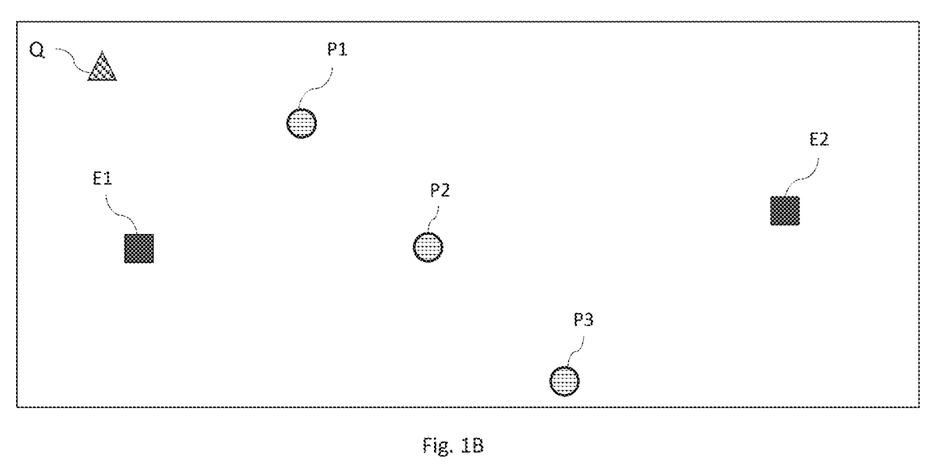
Figure 1C:
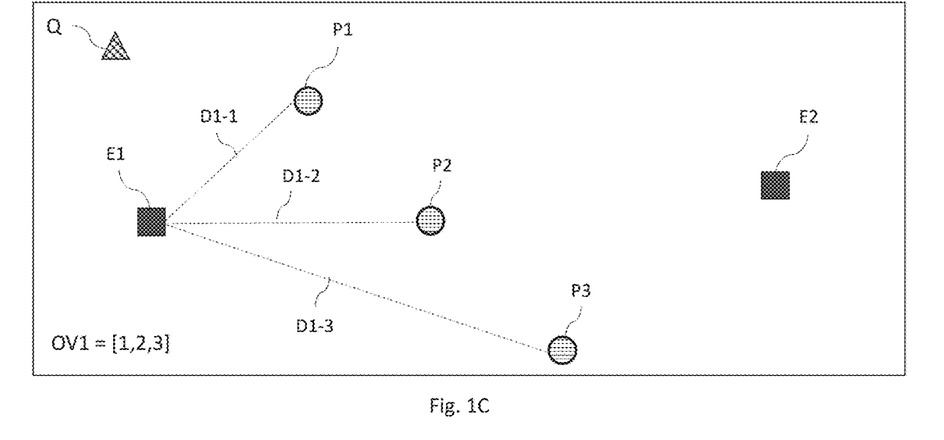
Figure 1D:
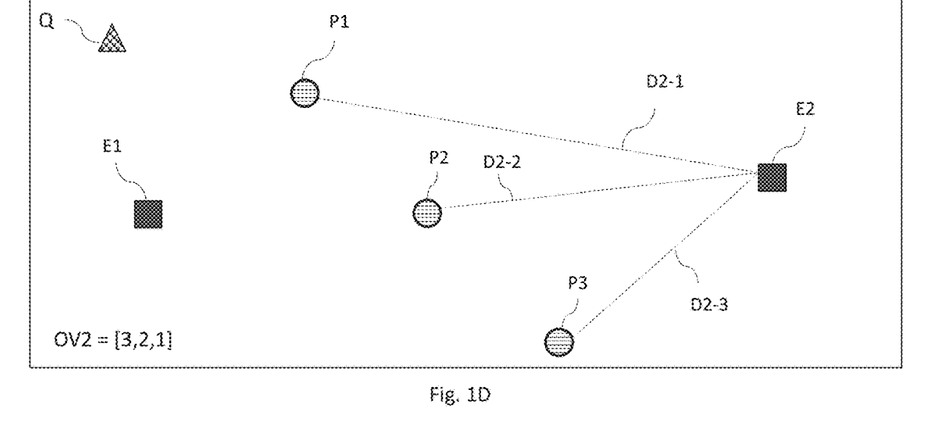

FIG. 1A illustrates two vectors E1 and E2 and a query vector Q for which the most similar vector (E1 or E2) should be determined. First, a smaller dimension database may be created by using a set of reference vectors (P1, P2 and P3), added to the space as illustrated in FIG. 1B, computing the distances between each vector (E1 and E2) and the reference vectors (P1, P2 and P3) and creating for each vector E (E1 and E2) a new vector OV (OV1 and OV2) with the ID of the reference vectors ordered by distance (between the vector and the reference vectors) as illustrated in FIGS. 1C and 1D. In FIG. 1C the distances between E1 and each reference vector (P1, P2 and P3) may be computed and indicated as D1-1 (distance between E1 and P1), D1-2 (distance between E1 and P2) and D1-3 (distance between E1 and P3). The computed distances may be sorted and a new distance vector OV1 may be created with the IDs of the reference vectors P from the closest to the farthest. In FIG. 1C, the smallest distance is D1-1, then D1-2 and then D1-3 therefore vector OV1 is [1,2,3]. In FIG. 1D the same procedure may be performed for E2 and the resultant vector OV2 is [3,2,1]. The same procedure may be performed for every vector Ei in a large dataset.

Figure 1E:
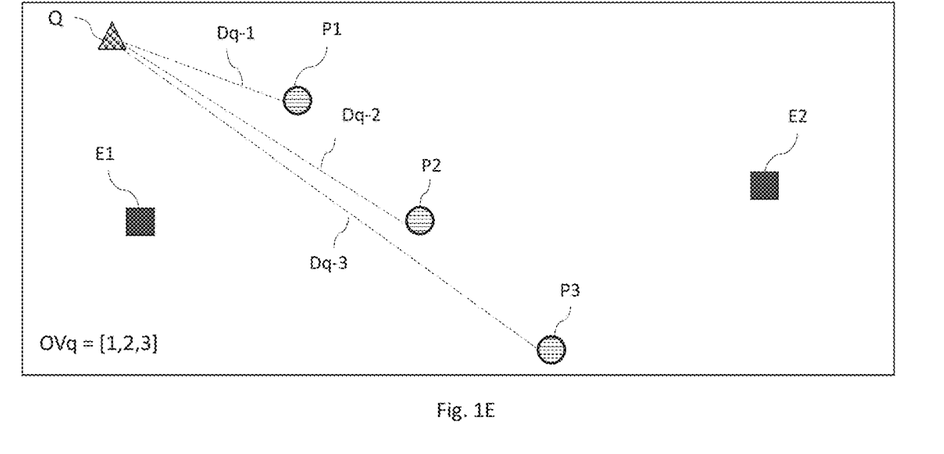

FIG. 1E illustrates the same procedure performed for a query Q which results with a vector OVq which is [1,2,3]. The resultant vector OVq may be compared to all other OV vectors (OV1 and OV2). The most similar vector in this example is OV1 which is [1,2,3] implying that query vector Q resembles vector E1 more than it resembles E2.

It may be appreciated that the dimension of the original vectors Ei may be large and the data stored in vectors Ei may be represented by floating point numbers while the dimension of the new OVi vectors, which is the number of reference vectors P, may be much smaller and the data may be represented by natural numbers, thereby reducing the size and complexity of the data to be searched.

Applicant has further realized that storing the dataset of OV vectors in a hierarchical structure, and possibly reducing the search to a subset of the records, may improve the performance of the search and may provide a good response time, a high throughput with low latency.

Figure 2:
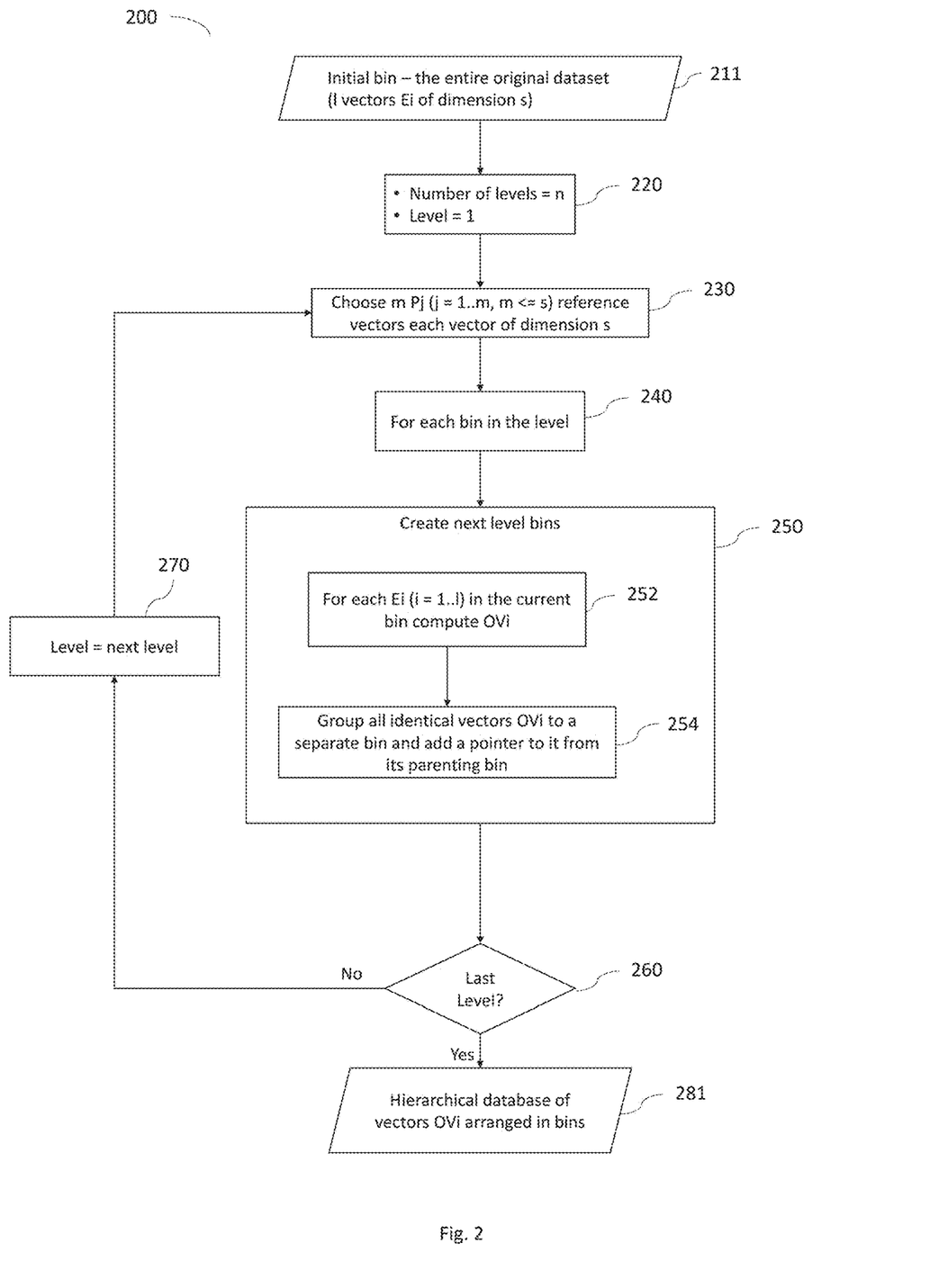
FIG. 2 is a schematic illustration of a flow implemented by systems constructed and operative in accordance with an embodiment of the present invention to build a hierarchical database of vectors using the distance similarity vector concept.

FIG. 2 to which reference is now made, is a schematic illustration of a flow 200, implemented by systems constructed in accordance with an embodiment of the present invention, to build a hierarchical database of OVi vectors from a dataset of Ei vectors. Flow 200 may be executed once, in advance, on the entire original database storing the higher dimension vectors of floating-point numbers and may produce a new hierarchical database storing smaller dimension vectors of natural numbers.

This pre-processing procedure may reduce the space needed to perform the search from an original dimension S to a smaller dimension M (M≤S). This procedure may create, for each original item in the space, a vector of M natural numbers. In addition, it may cluster several such vectors of the original space into bins of lower dimensional distance vectors, where each bin comprises the list of original Ei vectors sharing the same OV. Each bin may be associated with a small descriptor comprised of the bin ID and the OV. The new structure of bins may be stored in an associative memory array, where an associative tree search to find bins similar to the query may be concurrently performed on a plurality of bins.

Input 211 of the flow comprises the entire original dataset with L vectors Ei, each vector of dimension S, i.e. comprise S floating point numbers. In step 220, the system may be initialized with the number of levels n to create in the new hierarchical database, and the ID of the first level. It should be noted that the number of levels in the hierarchical database may be 1.

In step 230, the system may be configured to choose M Pj (j=1 . . . M, M<=S) reference vectors in dimension S. The procedure to select the M Pj reference vectors is described herein below. In step 240, the system may loop on all the bins in the level and in step 250, the system may be configured to create the bins of the next level. Specifically, in sub-step 252, the system may calculate an ordered vector OVi for each vector Ei (i=1 . . . l) by computing the distance Di-j to each reference vector Pj (j=1 . . . M); sort the values of the computed Di-j and create for each vector Ei, a new vector OVi with the ID j as explained herein above with respect to FIGS. 1C and 1D. It may be appreciated that the size of order vector OVi may be R (R≤M) such that order vector OVi contains only the R lowest values of Di-j, reducing the space to a value lower than the number of reference vectors Pi. This procedure may support selecting a large number of reference vectors while keeping the space of the search low. In sub-step 254, the system may be configured to cluster all identical vectors OVi to a separate bin and add an association between the parent and child bins. Each created bin may comprise a bin ID; the level in which it resides; the value of the vector OV common to all vectors Ei clustered in the bin, and a list of pointers (e.g. a list of the values i) to the vectors Ei contained in the bin.

In step 260, the system may be configured to check if the latest created level of the hierarchical database should be the final one. If the created level is not the last level, the system may continue to the next level and may return to steps 230, 240 and 250 to create the bins of the next level. If the created level is the last level, the system may provide as an output a hierarchical database 281 of vectors OVi arranged in bins. In one embodiment hierarchical database 281 may be stored in an associative processing unit (APU), each OV stored in a column of the memory array of the APU, on a system which may perform a parallel search operation on a plurality of columns.

Figure 3A:
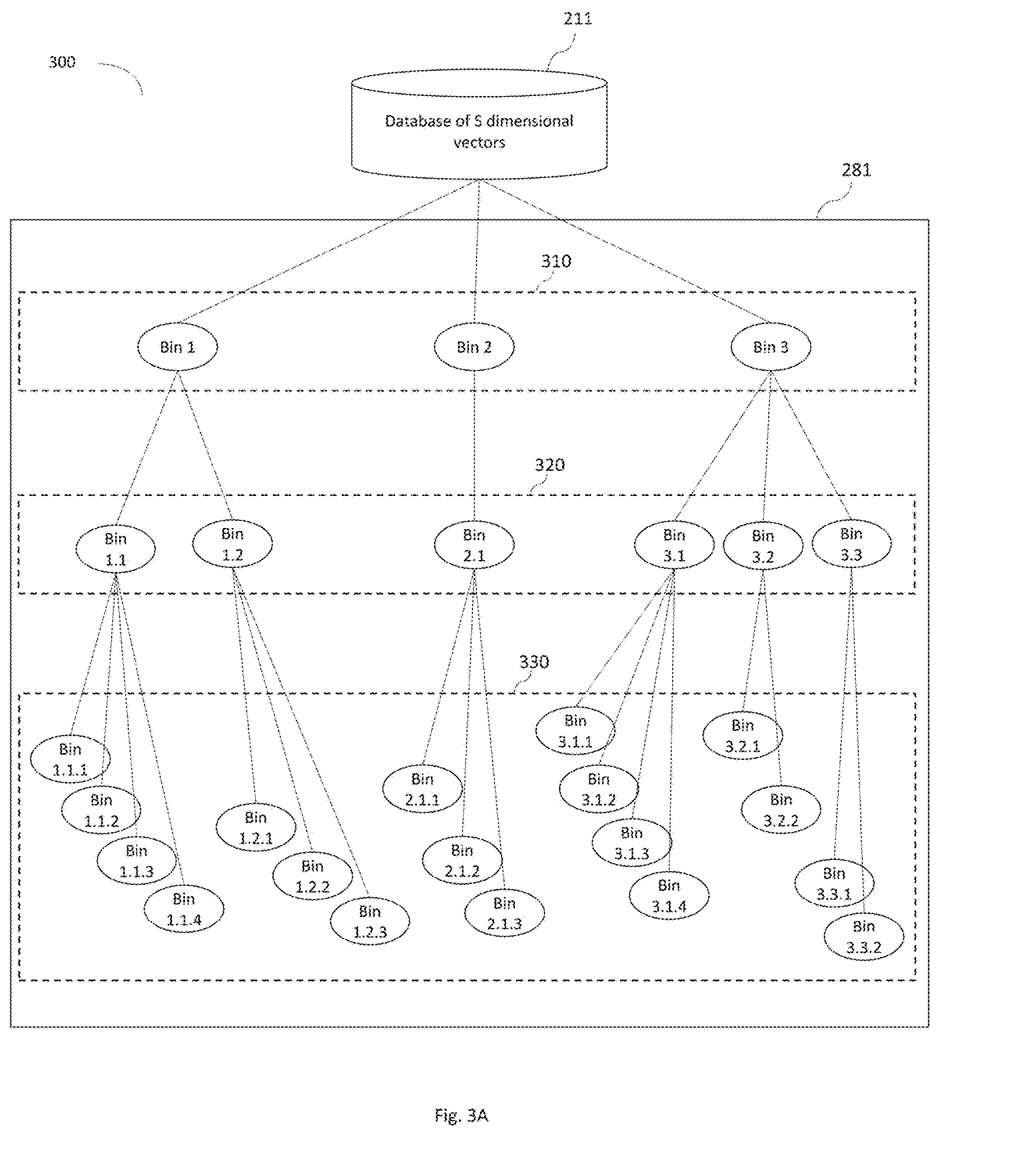
FIG. 3A is a schematic illustration of an exemplary hierarchical database created by the flow of FIG. 2.

FIG. 3A, to which reference is now made, is a schematic illustration of an exemplary hierarchical database 28, arranged in three levels 310, 320 and 330. The first level 310, comprises Bin 1; Bin 2 and Bin 3. The second level 320 comprises the next levels of bins. The next level below Bin 1 comprises Bin 1.1 and Bin 1.2. The levels may be connected by lines indicating the parent-child association between bins in the different levels. For example, Bin 3.3.2 is in the third level of bins and is a child of Bin 3.3 in the second level which is further a child of Bin 3 in the first level. It may be appreciated that using this type of hierarchical database may reduce the number of records to which OVq should be compared to a subset of OVi.

Figure 3B:
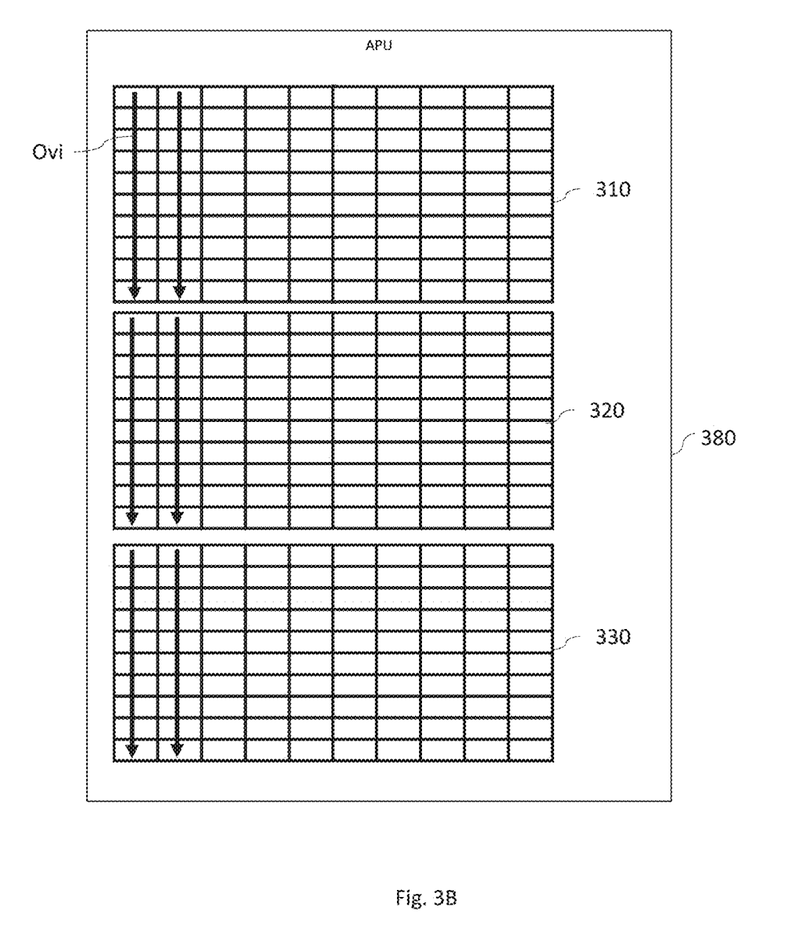
FIG. 3B is a schematic illustration of an arrangement of the hierarchical database of FIG. 3A in an associative processing unit (APU)

FIG. 3B, to which reference is now made, is a schematic illustration of the arrangement of hierarchical database 281 in an APU 380. The three levels 310, 320 and 330 of hierarchical database 281 may be stored in different sections of APU 380 and each section may be activated when a search is performed on that level. This arrangement of the data in the APU may enable a concurrent similarity search with a complexity of O(1) since all column of a section are searched in parallel.

Figure 4:
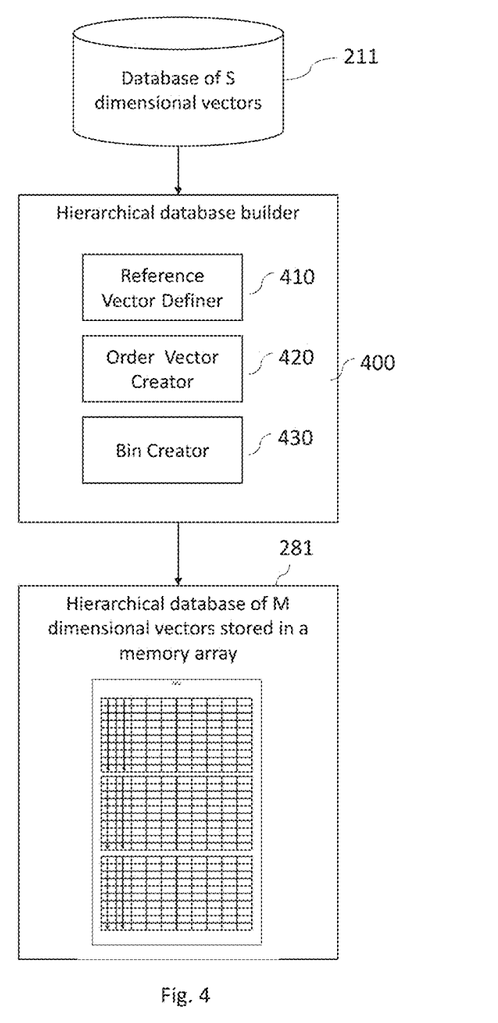
FIG. 4 is a schematic illustration of a hierarchical database builder, constructed and operative in accordance with an embodiment of the present invention, implementing the flow of FIG. 2.

FIG. 4, to which reference is now made, is a schematic illustration of a hierarchical database builder 400, constructed and operative in accordance with an embodiment of the present invention, implementing flow 200 (FIG. 2). Hierarchical database builder 400 comprises a reference vector definer 410; an order vector creator 420 and a bin creator 430. Hierarchical database builder 400 may implement flow 200 on the original database 211 of S dimensional vectors received as input and may create the hierarchical database 281 of M dimensional vectors as output.

Reference vector definer 410 may define the reference vectors Pi to be used in each bin for creating the next level. The reference vectors Pi may be defined per level, or per bin. Reference vector definer 410 may select random reference vectors Pi or may use a clustering method (like K-means) to create reference vectors Pi based on the records Ei associated with the bin. Alternatively reference vector definer 410 may use machine learning applications trained to find a set of reference vectors producing a small set of highly accurate search results. After training, the machine learning application may be used on a bin to find the reference vectors Pi to be used in that level.

Order vector creator 420 may implement step 252 of flow 200 to compute for any given vector Ei an order vector OVi comprising the IDs of the reference vectors to which a distance was computed, ordered by their distance from Ei.

Bin creator 430 may implement step 254 of flow 200 to cluster all similar OVs to a single bin, each bin comprising an ID, the OV representing the bin, a list of references to the original Ei's and an indication of the level of the bin in the hierarchy. Bin creator 430 may cluster OVs to a single bin using several approaches.

Figure 5:
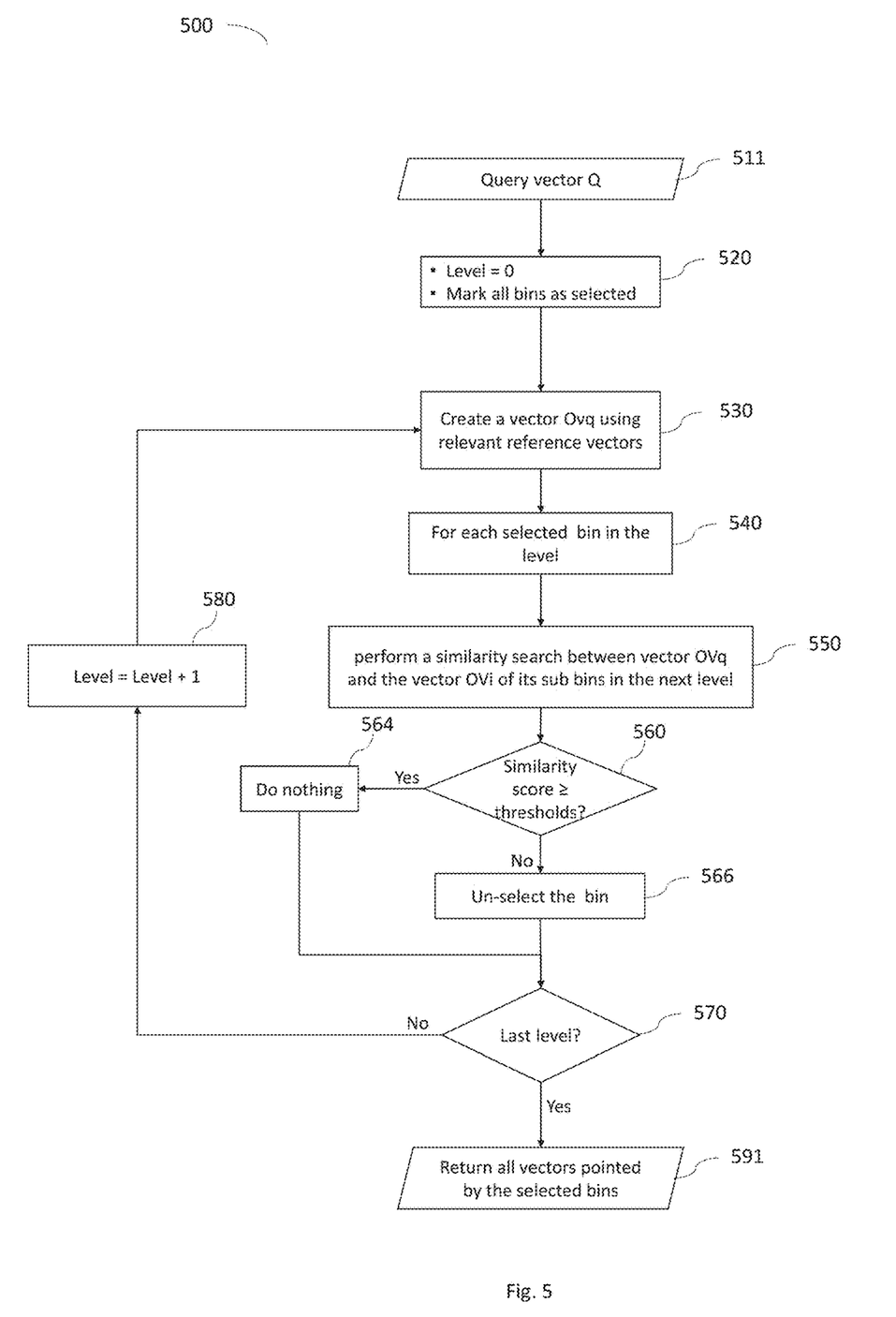
FIG. 5 is a schematic illustration of a flow, implemented by systems constructed in accordance with an embodiment of the present invention, to find a set of vectors in the hierarchical database similar to the query vector.

FIG. 5, to which reference is now made, is a schematic illustration of flow 500, implemented by systems constructed in accordance with an embodiment of the present invention. Flow 500 may receive a query Q as input 511 and may use hierarchical database 281 to find vectors Ei in database 211 similar to the query vector Q.

In step 520, the system may be initialized with a starting level of zero and all bins selected, i.e. starting potentially with all vectors Ei of database 211. In step 530, the system may create an OVq vector for query vector Q related to the relevant reference vectors Pi using a similar procedure to the one described with regards to sub-step 252, i.e. the system may be configured to compute the distance Dq-j to each reference vector Pj (j=1 ... M), may sort the values of the computed Dq-j and may create vector OVq with the IDs j of the R lowest values of Dq-j.

In step 540, the system may loop an all bins in the level and in step 550, the system may perform a similarity search between OVq and OVi of each bin in the processed level. In step 560, the similarity score may be compared to a pre-defined threshold. If the similarity score is higher than the threshold, the processed bin may remain selected, in step 564, indicating that vectors Ei associated with the bin are perceived to be similar to query vector Q; however, if the similarity score is lower than the pre-defined threshold, the system may remove the bin, in step 566, since vectors Ei associated with the bin are perceived to differ from query vector Q.

In step 570, the system may check if the search reached the last level of the database. If the search did not reach the last level, the system may increment the level in step 580 and may continue the search. If the search reached the last level, the search is considered to be completed, and the system may, in step 592, return all vectors Ei pointed to by the bins which remain selected. The OV of the returned bins are found to be similar to OVq and therefore, vectors Ei associated with those bins are similar to query vector Q.

The similarity threshold may be determined per bin or per level and may be changed (i.e. lowered) when the resultant set of records Ei is too large. Flow 500 may start on any level, including the last level, implying that the distance similarity search is performed on all lower level bins (leaf bins) and the tree is not pruned.

Figure 6:
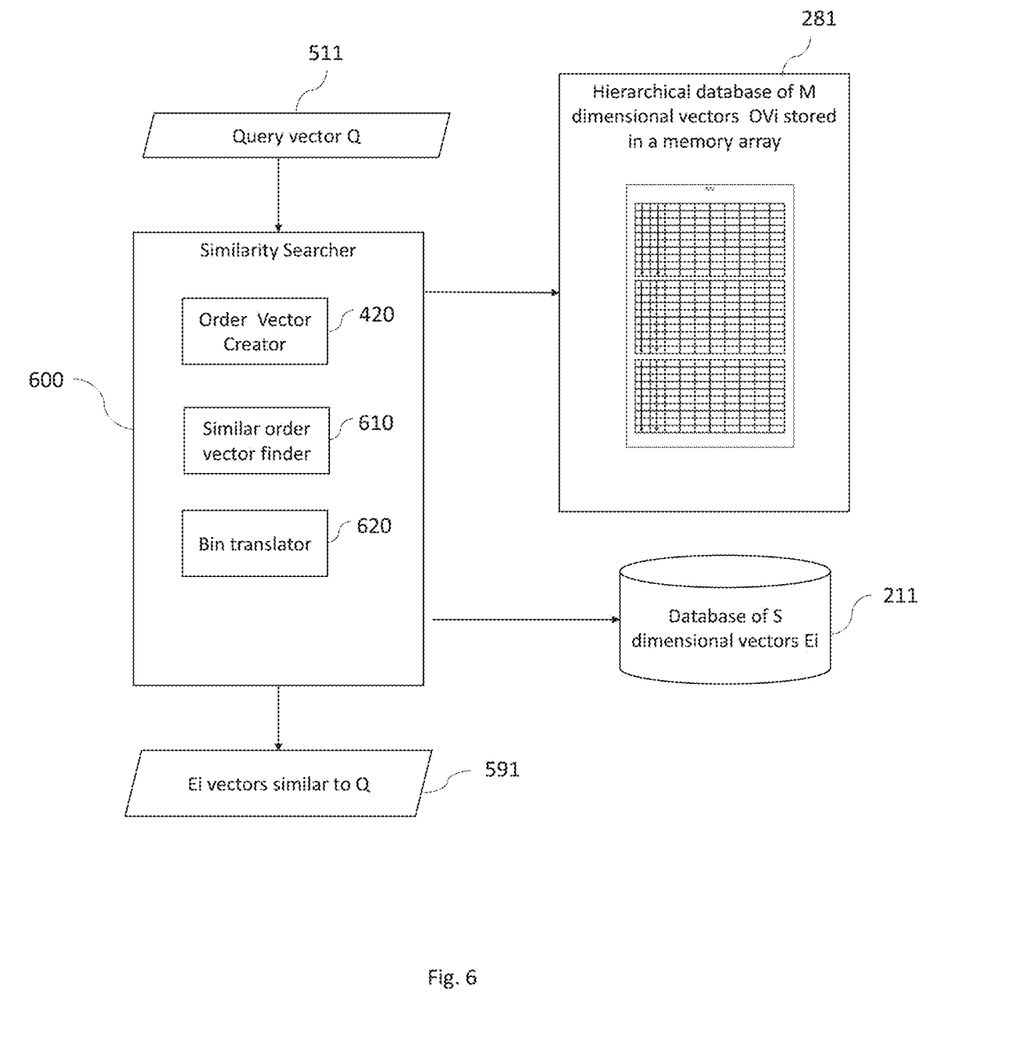
FIG. 6 is a schematic illustration of a similarity searcher, constructed and operative in accordance with an embodiment of the present invention, implementing the flow of FIG. 5.

FIG. 6, to which reference is now made, is a schematic illustration of a similarity searcher 600, constructed and operative in accordance with an embodiment of the present invention, implementing flow 500 (FIG. 5). Similarity searcher 600 comprises an order vector creator 420 (like the one used in hierarchical database builder 400), a similar order vector finder 610 and a bin translator 620. Similarity searcher 600 may communicate with hierarchical database 281 and with database 211.

Order vector creator 420 may implement step 530 of flow 500 to compute an order vector OVq comprising the IDs of the reference vectors Pj to which a distance from query vector Q was computed. The relevant reference vectors Pj may be the same reference vectors used to build the bin.

Similar order vector finder 610 may perform a similarity search in hierarchical database 281, stored in an associative memory, and may implement flow 500 to find the bins associated with an OV most similar to OVq. The similarity search may concurrently operate on all bins of a level and find a set of similar order vectors OVi in a single search operation regardless of the number of bins in the level. The similarity search may be based on any similarity algorithm, such as the hamming distance algorithm, the Euclidean distance algorithm, the intersection similarity algorithm and the like The similarity search may be done on all bins of a level concurrently using any similarity search algorithm. All vectors OVi, stored in the columns of APU 380, may be compared simultaneously with vector OVq. In the hamming algorithm, the similarity score may be the number of matching values in matching locations in the vector (i.e. vectors which have the same value in the same locations). In the intersection similarity algorithm, the similarity score may be the number of matching values ignoring the location (i.e. the order of the values in the OV may be ignored and only the values are considered). In all methods, the similarity score may be compared with a threshold and only those with a value larger than a threshold may be considered similar.

Bin translator 620 may deliver all vectors Ei associated with selected bins. As mentioned herein above, bins whose order vector resembles the order vector of query vector Q point to vectors Ei resembling query vector Q.

It may be appreciated, as already mentioned herein above, that storing hierarchical database 281 in the associative memory array of APU 380 may enable a concurrent similarity search with a complexity of O(1). Furthermore, the bin descriptor size may be small, (e.g. 64 bits), and therefore, a large number of bins may be stored in a single APU capable of performing a parallel associative tree search over all bins in a level simultaneously.

Figure 7A:
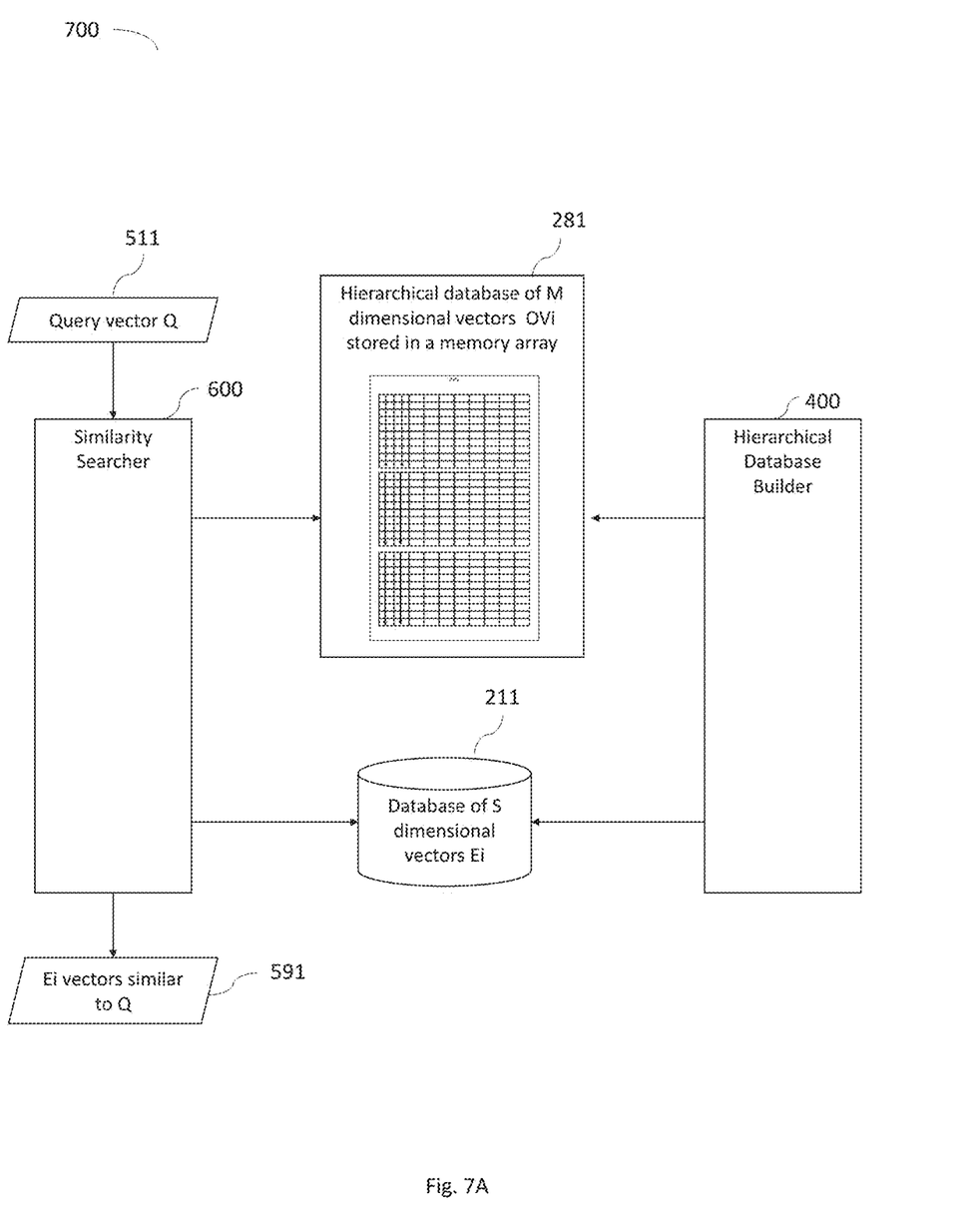
FIGS. 7A and 7B are two alternative schematic illustrations of a similarity search system constructed and operative in accordance with an embodiment of the present invention.
Figure 7B:
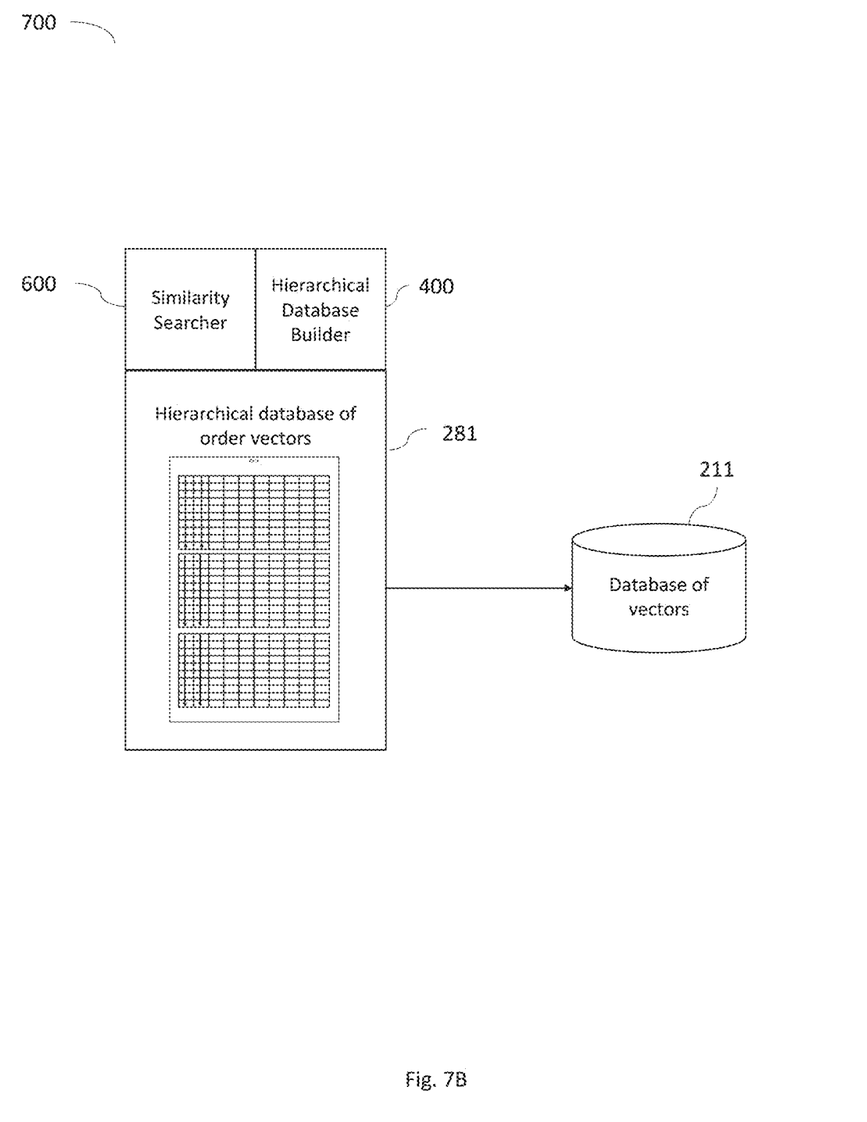

FIGS. 7A and 7B, to which reference is now made, are two alternative schematic illustrations of a similarity search system 700, constructed and operative in accordance with an embodiment of the present invention from components described herein above. Similarity search system 700 comprises database 211 storing the original vectors, hierarchical database 281 of bins, hierarchical database builder 400 to build database 281 from database 211 and similarity searcher 600 to receive a query vector Q, perform a similarity search in the hierarchical database builder 400 to find bins similar to an order vector representing query vector Q and provide a set of original vectors Ei most similar to query vector Q.

It may be appreciated that the steps shown for the exemplary flows herein above are not intended to be limiting and that the flow may be practiced with variations. These variations may include more steps, less step, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A similarity search system comprising:
    an associative processing unit (APU) comprising an associative memory array;
    a database comprising a plurality of original vectors;
    a hierarchical database builder to define a set of multiple different reference vectors in a dimension of said original vectors, each reference vector having an ID, to compute for each original vector a distance to each of said multiple reference vectors and to create an order vector comprising said IDs of said multiple reference vectors ordered within said order vector by how close each of said multiple reference vectors is to said original vector, wherein a dimension of said order vector is smaller than a dimension of said original vector;

a bin hierarchy stored in columns of said associative memory array, each bin identified by one of said order vectors and each bin also comprising a list of references to a set of said original vectors associated therewith; and a similarity searcher implemented on said APU to search simultaneously on a plurality of said columns of said associative memory array for at least one similar bin whose order vector resembles an order vector representing a query vector and to provide said at least one original vector associated with at least one similar bin, said at least one original vector resembling said query vector, wherein said bin hierarchy comprises at least two levels, each level stored in a different section of said associative memory array, and each level is associated with a different set of said multiple different reference vectors, wherein a bin in a level is associated with bins in a lower level, and said similarity searcher to start said search in a first level of said bin hierarchy and to continue with bins in a lower level associated with bins found in said first level.

2. The similarity search system of claim 1, said hierarchical database builder also to cluster order vectors representing different original vectors but having a same order vector to a single bin.

3. A method for finding a set of vectors in a database of original vectors, said set of vectors similar to a query vector, the method comprising:

defining a set of multiple different reference vectors in a dimension of a plurality of original vectors, each reference vector having an ID;

computing for each original vector a distance to each of said multiple reference vectors;

creating an order vector comprising said IDs of said multiple reference vectors ordered within said order vector by how close each of said multiple reference vectors is to said original vector, wherein a dimension of said order vector is smaller than a dimension of said original vector;

creating a query order vector associated with a query vector using said set of multiple different reference vectors;

storing a bin hierarchy in columns of an associative memory array of an associative processing unit (APU), each bin identified by one of said order vectors and each bin also comprising a list of references to a set of said original vectors associated therewith; and searching simultaneously on a plurality of said columns of said associative memory array for at least one similar bin whose order vector resembles said query order vector; and providing said at least one original vector associated with at least one said similar bin, said at least one original vector resembling said query vector, wherein said bin hierarchy comprises at least two levels, each level stored in a different section of said associative memory array, and each level is associated with a different set of said multiple different reference vectors, wherein a bin in a level is associated with bins in a lower level, and said searching to start said search in a first level of said bin hierarchy and continuing with bins in a lower level associated with bins found in said first level.

4. The method of claim 3 also comprising clustering order vectors representing different original vectors but having a same order vector to a single bin.

* * * * *